Nov. 17, 1936.   J. S. McCHESNEY   2,061,037
METHOD OF PRODUCING FLANGED JOINT FASTENERS
Filed Oct. 4, 1933   2 Sheets-Sheet 2
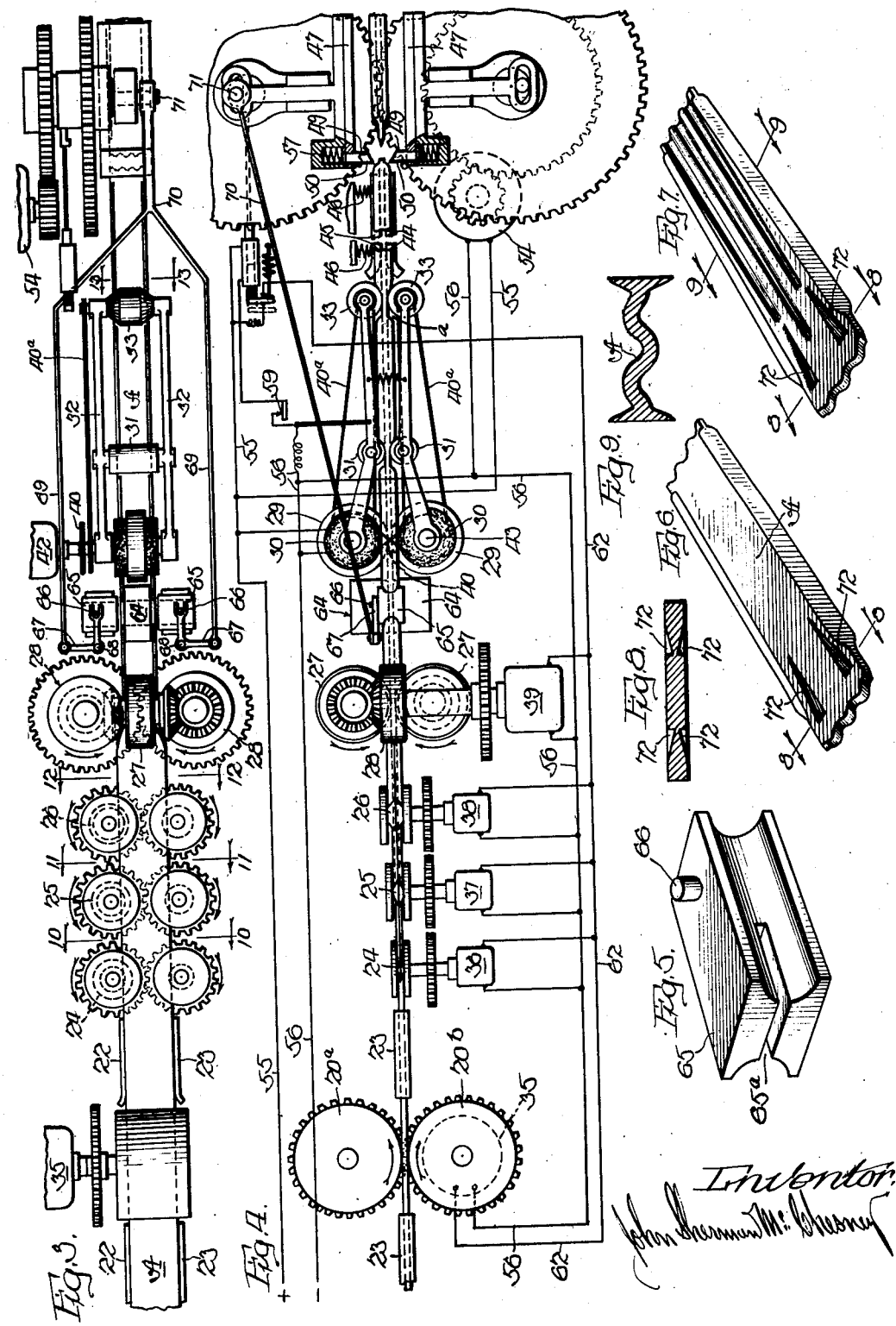

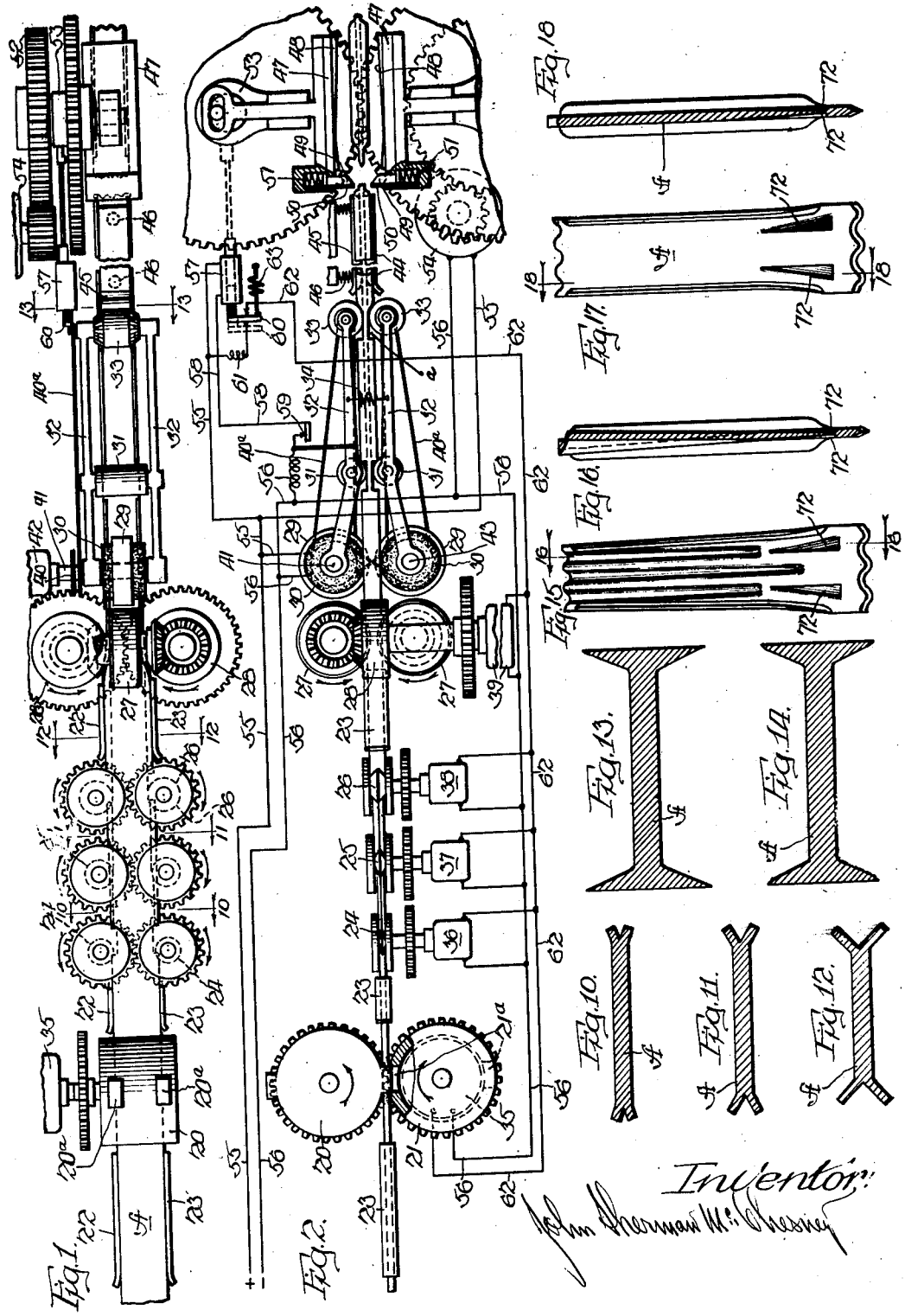
Nov. 17, 1936. J. S. McCHESNEY 2,061,037
METHOD OF PRODUCING FLANGED JOINT FASTENERS
Filed Oct. 4, 1933 2 Sheets-Sheet 1

UNITED STATES PATENT OFFICE 2,061,037

METHOD OF PRODUCING FLANGED JOINT FASTENERS

John Sherman McChesney, Chicago, Ill.; Lula A. McChesney, executrix of said John Sherman McChesney, deceased, assignor to Lula A. McChesney, individually Application October 4, 1933, Serial No. 692,069

19 Claims. (Cl. 10—34)

The invention relates to the method of producing flanged fasteners of I-shaped cross section and more particularly to that type of fastener having flanges inclined reversely to each other in combination with a pilot tongue extending beyond said flanges on the penetrating end and adapted to enter saw kerfs cut in adjoining pieces of material in advance of the flange.

An outstanding difficulty in the rapid and economical production of side flanges on fasteners made from metallic ribbon has been the great force required to upset the metal and turn it back into the web of the ribbon. Heretofore, this has been accomplished by repeated passes of the ribbon in the path of flat faced swaging rolls which gradually force the metal into the desired shape at great expense of time, effort and labor.

A general object of my invention is to obviate the foregoing and other difficulties, whereby I am enabled to produce fasteners of the type herein described, rapidly and with maximum economy and efficiency.

Still another object is the production of a flanged fastener adapted to draw the abutting surfaces of a joint into forced fixed relation upon the entrance of the flange into the material and thereafter to maintain the flanges in their closed position without exerting additional force.

I illustrate my invention more or less diagrammatically in the accompanying drawings, wherein,—

Figure 1 is a diagrammatic top plan view of a machine for making fasteners embodying my invention, wherein the metallic ribbon is notched to pre-determine the length of the fastener.

Fig. 2 is a view in side elevation of Fig. 1.

Fig. 3 is a diagrammatic top plan view similar to Fig. 1, illustrating a modified arrangement of the notching elements.

Fig. 4 is a view in side elevation of Fig. 3.

Fig. 5 is an enlarged detailed perspective view of the flange notching die.

Fig. 6 is a perspective view of one of the fasteners.

Fig. 7 is a perspective view of one of the finished fasteners having the web thereof corrugated longitudinally of its length.

Fig. 8 is a cross sectional view taken on lines 8—8 of Fig. 6 and Fig. 7.

Fig. 9 is a cross sectional view taken on line 9—9 of Fig. 7.

Fig. 10 is an enlarged detailed cross sectional view of a partially slitted metal ribbon taken on line 10—10 of Figs. 1 and 3.

Fig. 11 is a cross sectional view similar to Fig. 10 taken on lines 11—11 of Figs. 1 and 3 showing a deeper slit in the side edges of the metal ribbon.

Fig. 12 is a sectional view similar to Figs. 10 and 11 taken on the lines 12—12 of Fig. 1 and and Fig. 3, illustrating a still deeper slitting of the side edges of the metal ribbon and the material being spread by the slitting cutters forming an included angle of approximately 90 degrees.

Fig. 13 is a cross sectional view taken on the lines 13—13 of Fig. 1 and Fig. 3 showing the slitted metal swaged to form side flanges on the metal ribbon.

Fig. 14 is a view similar to Fig. 13 showing the inner apexes of the flanges as they leave the rolls 27 and 28.

Fig. 15 is a face view of Fig. 7 showing a finished fastener having longitudinal corrugations extending short of the penetrating end.

Fig. 16 is a vertical sectional view taken on the line 16—16 of Fig. 15.

Fig. 17 is a face view of Fig. 6 showing a finished fastener having a straight flat web portion.

Fig. 18 is a vertical sectional view taken on line 18—18 of Fig. 17.

Like parts are indicated by like characters thruout the specification and drawings.

In carrying the invention into effect, I start with a metal ribbon A which may be supplied from a coil (not shown) and having a sufficient thickness to be slitted along each edge longitudinally of its length and of a width depending upon the desired width of the fastener.

The metal forming the source of supply is a band of metallic ribbon A indeterminate as to length and of the required gauge and width, preferably accumulated in a coil or reel (not shown). The ribbon is fed in the direction of its length by a pair of feeding rolls 20 and 21 which advance the ribbon successively through fastener forming elements. The ribbon is maintained in operative relation with said elements by means of a guide channel bounded by channel-forming members 22 and 23, which members are shown as plates positioned in parallel relation. The members or plates extend lengthwise of the machine for directing the ribbon in a predetermined path in operative relation with the slitting rolls 24, 25 and 26.

The paired slitting rolls 24, 25 and 26 are successively arranged and are mounted on rotating shafts. The cutting edges of the rolls contact the ribbon on the faces of the narrow longitudinal side edges, i. e., substantially in the longitudinal mid plane of the ribbon. Each pair of slitting rolls progressively slits the ribbon to a greater depth and causes the slit portions to spread outwardly, as is clearly shown in Figs. 10, 11 and 12, thus forming embryonic side flanges; the finished flanges are shown in Figs. 13 and 14. The ribbon continues to advance between a pair of beveled-edged rolls 27 which grip and force the slitted side edges thereof between a pair of swaging rolls 28 to swage that portion of the stock which has been spread outwardly on each side of a medial line therethru, producing flanges having a sharp cutting edge. The rolls 27 are narrower than the width of the ribbon A and engage the stock along its surface approximately the width of the distance between the depth of the slits on each side edge of the stock. The swaging rolls 28 are mounted at a right-angle to the beveled rolls 27 with their peripheries clearing the side walls thereof by a few thousandths of an inch, so that, as the ribbon is fed between the rolls 27 the spread portion of the ribbon A will be forced or swaged against the side walls thereof and the peripheries of the swaging rolls 28 will form a compressed flange of the slitted spread metal of the side edges of the ribbon. In order to swage the flanges on the side edges of the ribbon to a relatively sharp-cutting edge, the rolls 27 are beveled at the edges in accordance with the desired shape of the flanges. While, as illustrated, a gradually tapered flange is formed on the ribbon, other styles or shapes of flange may be produced according to the formation of the edges of the rolls 27. After the flanges have been swaged, the ribbon then passes between a pair of relatively narrow rollers 29 which grip and feed the ribbon and which have mounted on each side thereof the grinding wheels 30 which are of a diameter sufficient to engage and grind away the rough and irregular edges of the flanges.

The combined feeding and notching rolls 20 and 21 notch out portions a at given intervals in the side edges of the ribbon A, and the depth of the slitting which is progressively produced in the side edges of the stock extends approximately the depth of the notches and when swaged to form flanges by means of the co-acting rolls 27—27 and 28—28, that portion of the side edges which has been slit will be easily formed into the desired shape of flange. This swaging action compresses the material forming the flanges flush with the innermost edge of the notch and forms straight side edges perpendicular to the mid plane of the ribbon.

The length of the fastener is the distance between the notches and as the metal is swaged only that portion of the metal at the side edges between the notches is formed into flanges. These flanges extend outwardly of both faces of the ribbon and are then fed between a pair of rollers 31 adapted to rest on the edge of the flanges and which are supported on a pair of arms 32, pivotally mounted on the axial center of the rollers 29. At the extreme end of the arms 32 are milling cutters 33 adapted to be positioned into that space in the flanges formed by the notching members of the rolls 20 and 21. As the stock advances, these notches gradually come into register with the rollers 31 and the tension springs 34 attached to each pair of arms 32 will cause the arms to be drawn together and the milling cutters 33 will engage the flanges adjacent the notched out portions a. The milling cutters 33 are of greater diameter than the rollers 31 and the distance between the center of the rollers 31 and the milling cutters 33 is equal to the distance between the notched out portions a of the flanges of the stock, so that, as the rollers 31 ride off of the edge of the flanges, the milling cutters 33 will then engage the inner corner edges of the flanges and trim them to a very sharp cutting edge. The milling cutters 33 engage the inner side edges of the flanges at about a 45° angle, trimming the corners as well as producing a sharp-cutting penetrating edge.

As thus far described, the elements assist in driving the ribbon in its direction of travel thru the machine, but obviously the means of feeding the ribbon, as well as the relative positioning of the elements, may be changed as desired. The elements may be driven thru a chain of gears or thru other driving means or may be driven independently by means of individual motors for each operating element.

In the drawings I show diagrammatically without regard to the bearings or the supports, the position of the various elements employed to produce the fastener. It will be understood that various arrangements and types of drive may be employed in the construction and operation of these elements. I also refer to the various elements as being gear-driven and the gearing shown herein is merely one of a number of means of driving these elements to produce the proper direction of travel of the ribbon.

The combined co-acting feeding and notching rolls 20 and 21 are geared together and driven by means of the motor 35 and each of the slitting cutters 24, 25 and 26 are geared together in pairs and driven by means of the motors 36, 37 and 38 respectively, while the paired co-acting rolls 27 are mounted at right-angles to the paired co-acting rolls 28 and are geared together by means of bevel and spur gears and driven by means of a motor 39. The rolls 29 and grinding wheels 30 are driven by means of a twisted belt 40 from the power shaft 41 and the milling cutters 33 are driven by means of a belt 40ª extending to the power shaft 41 which is driven by the motor 42. The lower milling cutter 33 is also driven by means of a belt 40ª extending to the power shaft 41 which is driven by the motor 42. The lower milling cutter 33 is also driven by means of a belt 40ª extending to the shaft 43 as driven by the twisted belt 40.

Up to this point the ribbon has been notched at given intervals and the side edges slit to the depth of the notches, swaged to produce flanges, then the flanges have been milled at the edges and the ribbon is then ready to be severed traverse the notched out portions to form the finished fastener.

The finished fastener is provided with sharp-cutting side flanges on the sides of the web and a swage-hardened, sharp-cutting penetrating end and a rather blunt driving end. The penetrating end of the fastener is provided with a pilot tongue and an outwardly flared flange. As shown in Figs. 15 and 17 two types of fasteners are illustrated, one having a corrugated web extending longitudinally of its length while the other has a plain flat web.

The ribbon advances from the milling cutters 33, between the fixed guide 44 and the yielding guide 45 held in engagement with the ribbon by means of the springs 46, and then advances between oppositely disposed swage severing dies 47. The dies 47 are provided with corrugations 48 adapted to interfit with each other and extending from the rearward end of the dies to a point within the penetrating end of the fastener to provide a corrugated web as shown in Fig. 15. When a plain web is desired, the corrugations are omitted on the dies and the dies serve to spank the web to insure a perfectly straight and flat fastener as shown in Fig. 6 and Fig. 17. At the forward or receiving end of the paired co-acting dies 47 are positioned a pair of spring pressed oppositely disposed swaging cutters 49, whose function is to sever the ribbon transversely and to form a pointed penetrating end and a blunt driving end on the fastener. The cutters 49 extend transversely of the ribbon and may have a cutting edge of any desired shape to form the sharp penetrating edge and the blunt driving edge of the fastener. On each side of the cutting edge of the cutters 49 are contacting lands 50 which function to prevent the opposed cutting edges from contacting during the severing of the ribbon. As these dies 47 are actuated, the cutters 49 will be brought into contact with the ribbon in advance of the dies 47, so that the stock will be partially severed due to the force of the springs 51 before the dies 47 engage the stock, at which time the springs 51 are compressed and the cutters 49 and the dies 47 move substantially as one.

The press is of the one revolution crank type having a constantly driven flywheel 52 and a one revolution clutch 53 adapted to intermittently engage the fly-wheel 52 to actuate the dies 47. A constantly running motor 54 drives the flywheel 52 and receives its power from a main source of electric current by means of the supply and return wires 55 and 56 respectively. These wires are also directly connected to the motor 42 by means of the leads 55 and 56 (see Fig. 2). The return wire 56 is connected to the motors 35, 36, 37, 38 and 39, while the supply wire 55 is connected to a dash pot type of solenoid 57 attached to the one revolution mechanically operated clutch 53 of conventional design, the return lead 58 extending to a make and break contact 59 which is connected to the return 56 and controlled by means of the arm 32.

The solenoid 57 is provided with an arm 60 carried by and insulated from the movable part of the solenoid 57 which is connected to the supply wire 55 by means of the lead 61, the lead 61 being movable with the arm 60 into and out of contact with a return wire 62 to complete the circuit to the motors 35, 36, 37, 38 and 39.

Assuming that all the motors are running and that the ribbon is advancing in the direction of its length through the machine elements as shown in Figs. 1, 2, 3, and 4, it will be oserved that the unflanged section of the ribbon A engages the rollers 31 which have just dropped off the outer edges of the flanges and have entered the notched out section of the ribbon and the arm 32 carrying the make and break switch 59 has thus closed said switch and has completed an electric circuit 56—58, the current energizing a solenoid 57. The solenoid is of the conventional type and in addition has a plunger arm having a make and break switch and a spiral spring 63 at one end and a clutch release rod connected at the other end to the clutch release of a one revolution clutch 53. This clutch is of the well known treadle type in general use on punch presses, wire stitchers and like machines. At this point the energized solenoid moves against the tension of the spiral spring 63 and the clutch release rod is depressed and withdraws the clutch release out of engagement with the clutch 53 which then effects one revolution of the shaft 71, as shown in Figs. 1, 2, 3 and 4, and at the same time the switch of the arm 60 breaks the circuit through the return wire 62 leading to the motors 35, 36, 37, 38 and 39, the object of the momentary shutting off of the current being to temporarily reduce the motor speed and the forward movement of the ribbon so that the oppositely positioned reciprocating dies 47 have a longer time in which to perform their respective functions. It will be understood that when the ribbon is traveling at a relatively slow speed when compared with the speed of the reciprocating dies, that the shutting off of the current to the motors by the solenoid plunger 60 is not essential to the successful operation of the machine and particularly to the portion of the machine operating the reciprocating dies 47. One of the functions of the dies 47 is to swage depressions 72 in the nail or fastener shown in Figs. 6, 7, 8, 15, 16, 17 and 18, resulting in outwardly flaring the flanges; another function being to simultaneously sever a finished flanged nail or fastener from the ribbon A and still another is to produce corrugations in the web of the nail as shown in Figs. 7, 9, 15 and 16.

The completion of one revolution of the crank shaft 71 which is powered with a motor 54 having a toothed pinion meshing with a toothed flywheel 52 clutch connected with the shaft 71, causes the reciprocal movement of the dies 47. The release of the "one revolution", or as it is sometimes known "single stroke", mechanical clutch 53 is accomplished by the solenoid 57 and the plunger 60 thereof. This solenoid plunger performs the same function as that of a punch press operator who uses his foot to manually depress the clutch release and thereby to cause the reciprocating parts of the press to function. After the current through the line 62—56 is cut off the ribbon A will continue its forward movement due to momentum but will be slightly slowed by the momentary interruption of the current through the circuit 62. As the ribbon continues its forward movement the rolls 31 again climb the flanges, the switch 59 opens and the solenoid plunger 60 returns to its position of rest assisted by the pull of the spring 63. The electrical circuit broken by the solenoid plunger 60 is again closed energizing the motors and thereby continuing the cycle of operations.

More specifically stated, the solenoid 57 encases a plunger 60 provided with a make and break switch and a tension spring 63 positioned at one end and at the other end connected to the clutch release of the conventional type of "one revolution" or "single stroke" clutch 53, the clutch being in such general use that the details thereof are omitted. The solenoid when energized causes its plunger to move against the resistance of a tension spring 63, the movement continuing until the circuit 62 is opened thereby disconnecting the motors of the circuit. The ribbon A continues its forward movement due to the momentum of the moving parts notwithstanding the momentary interruption of the current through the circuit 62.

In Figs. 3 and 4 the ribbon is fed into the machine by means of the feed rolls 20$^b$ and 21$^b$ which do not notch the stock but which carry it forward to pass through slitting cutters 24, 25 and 26 and then thru guide and swaging rolls 27 and 28 respectively. The notching of the flanges takes place just after this operation and the various elements 29, 30, 31, 33 and 47 will function as above described. The wiring circuit is connected in the same manner and is applied alike to both of the above arrangements.

With this last arrangement, the notching is done after the flanges have been swaged and only the flanges are notched producing the same result as described in Figs. 1 and 2 with the side edge of the projecting tongue or penetrating end of the fastener flush with the outside edge of the flanges.

The notching is produced by means of a pair of stationary die members 64 arranged above and below the path of the stock and having companion die members 65 adapted to enter the die members 64 and spaced a sufficient distance therefrom to permit the passing of the extending flanges of the stock therebetween. Each movable die member 65 has a pin 66 to which the forked end of a bell-crank 67 is attached and which is pivoted at 68, the other leg of which is connected to arms 69 terminating into a yoke 70 adapted to receive the free end of the crank pin 71 of the double acting press. As the press is operated by means of the clutch 53 the notching dies 65 will be caused to move inwardly against the flanges of the stock and the stationary die members 64, cutting off a length of the flanges simultaneously on each side thereof and flush with the surfaces of the material.

The movable notching dies 65 may be of the desired shape to produce either a rounded or square edge to the flanges as shown in Fig. 5, the die 65 is formed of a solid piece of steel having a horizontal slot 65ª the width of the thickness of the ribbon material and the side edges thereof curved outwardly to form the cutting edge, and when in use, will sever the flanges of the ribbon the shape of the cutting edge.

The ribbon A advances from the notching dies 65 to the grinding wheels 30 and to the rolls 31 which engage and disengage the notches in the flanges to position the milling cutters 33 as above described, for milling the edges of the flanges. The stock then advances to the double acting press, between the dies 47 and cutters 49 to be severed transversely of the notches.

The dies 47 provided with the corrugations 48 produce a fastener as shown in Fig. 15, and when the corrugations are omitted, a fastener having a straight flat web is produced (see Fig. 17).

These fasteners are normally flared by means of the depressions 72 formed in the web adjacent the penetrating edge and the flanges. The formation of the depressions 72 made by the dies are deep near the central portion of the web and taper to the surface to cause the metal to be forced outwardly on both sides, causing the flanges to flare a like distance.

When the web is corrugated (see Fig. 15), the corrugations are tapered, being deeper at the driven end of the fastener than at the penetrating end, causing the side flanges to converge toward the driving end of the fastener forming a tapered fastener having flared flanges at the penetrating end thereof.

I contemplate as being included in these improvements all such changes, variations and departures from what is thus specifically illustrated and described as fall within the scope of the appended claims.

I claim:—

1. The method of producing a flanged joint nail from metallic ribbon which comprises employing a ribbon indefinite as to length, guiding the ribbon in a definite path, notching out portions of the side edges of the ribbon to a suitable depth, slitting the ribbon longitudinally of its length between the side edges of its narrow faces, swaging the slit portions between the notches into flanges, then severing the ribbon transversely at the notches to form the finished fastener.

2. The method of producing a flanged joint nail from metallic ribbon which comprises employing a ribbon indefinite as to length, guiding the ribbon in a definite path, notching out portions of the side edges of the ribbon to a suitable depth, slitting the ribbon longitudinally of its length between the side edges of its narrow faces, swaging the slitted portions between the notches into flanges, grinding the irregularities of the edges of the flanges parallel to the face of the ribbon, then severing the ribbon transversely at the notches to form the finished fastener.

3. The method of producing a flanged joint nail from metallic ribbon which comprises employing a ribbon indefinite as to length, guiding the ribbon in a definite path, notching out portions of the side edges of the ribbon to a suitable depth, slitting the ribbon longitudinally of its length between the side edges of its narrow faces, swaging the slitted portions into flanges and milling inclined sharp edges on the flanges at the notched out portions, then severing the ribbon transversely at the notches to form the finished fastener.

4. The method of producing a flanged joint nail from metallic ribbon which comprises employing a ribbon indefinite as to length, guiding the ribbon in a definite path, notching out portions of the side edges of the ribbon, slitting the ribbon longitudinally of its length between the side edges of its narrow faces and to the depth of the notches, swaging the slitted portions between the notches into flanges, grinding the irregularities of the edges of the flanges parallel to the faces of the ribbon and milling inclined sharp edges on the flanges at the notched out portions, then severing the ribbon transversely at notches to form the finished fastener.

5. The method of producing a flanged joint nail from metallic ribbon which comprises employing a ribbon indefinite as to length, guiding the ribbon in a definite path, slitting the ribbon to a suitable depth longitudinally of its length between the side edges of its narrow faces, swaging the slitted portions into flanges having their inner faces oppositely inclined and oppositely disposed on the faces of the ribbon, then severing the ribbon at the notches to produce a finished fastener.

6. The method of producing a flanged joint nail from metallic ribbon which comprises employing a ribbon indefinite as to length, guiding the ribbon in a definite path, notching the ribbon on the opposite side edges, slitting the side edges thereof, swaging the slitted portion into flanges having their outer faces flush with the depth of the notches, then severing the ribbon at the notches to produce a finished fastener.

7. The method of producing a flanged joint nail from metallic ribbon which comprises employing a ribbon indefinite as to length, guiding the ribbon in a definite path, notching the ribbon on the opposite side edges, slitting the side edges intermediate the faces of the ribbon and to the depth of the notches, swaging the slitted portions into flanges having their outer faces flush with the depth of the notches, then severing the ribbon at the notches and flaring the flanges at the penetrating end.

8. The method of producing a flanged joint nail from metallic ribbon which comprises employing a ribbon indefinite as to length, guiding the ribbon in a definite path, notching out portions at the side edges of the ribbon, slitting the ribbon substantially to the depth of the notches between the edges of its narrow faces, swaging the slitted portions into flanges, then severing the ribbon transversely at the notches and flaring the flanges outwardly to form the finished fastener.

9. The method of producing flanged joint nails from metallic ribbon which comprises providing a ribbon indefinite as to length, guiding the ribbon in a definite path with respect to processing elements, slitting the ribbon longitudinally of its length mid way of the edges of its narrow faces, swaging the slit metal into oppositely disposed parallel side flanges flaring the flanges outwardly at the penetrating end without disturbing the parallel relation of the flanges at the driving end, and severing the ribbon transversely forming a finished fastener.

10. The method of forming flanged nails comprising notching metallic ribbon at spaced intervals along the side edges, slitting the ribbon to a predetermined depth in the direction of its length between the side edges of its narrow faces, swaging the slitted portions into sharp edged flanges, then severing the ribbon transverse the notches thereby forming the finished fastener.

11. The method of forming flanged nails comprising notching metallic ribbon at spaced intervals along the side edges, slitting the ribbon to a predetermined depth in the direction of its length between the side edges of its narrow faces, swaging the slitted portions into sharp edged flanges, swaging the ribbon between the flanges at the penetrating end thereby outwardly flaring the flanges, then severing the ribbon transverse the notches thereby forming the finished fastener.

12. The method of forming flanged nails comprising notching metallic ribbon at spaced intervals along the side edges, slitting the ribbon to a predetermined depth in the direction of its length between the side edges of its narrow faces, swaging the slitted portions into sharp edged beveled flanges, corrugating the metal between the flanges and short of the penetrating end thereby outwardly flaring the flanges at the penetrating end, then severing the ribbon transverse the notches thereby forming the finished fastener.

13. The method of forming flanged nails which comprises advancing a ribbon indeterminate as to length in a definite path into operative relation with notches for notching out sections of the ribbon at the side edge thereof, then into operative relation with a succession of slitting elements for slitting the relatively narrow side faces of the ribbon, then into operative relation with flange-forming swagers for upsetting the slit edges of the ribbon, then severing the ribbon transverse the notches and simultaneously outwardly flaring the flanges of the penetrating end to complete the nail.

14. The method of forming flanged nails which comprises advancing a ribbon indeterminate as to length in a definite path into operative relation with notchers for notching the ribbon on the opposite side edges, then into operative relation with a succession of slitting elements for slitting the relatively narrow side faces between the edges thereof, then into operative relation with flange-forming swagers swaging the slit portions of the edges into flanges, then severing the ribbon transverse the notches thereby producing a finished nail having a sharpened penetrating end and a blunt driving end and providing a blunt driving end on the next succeeding nail.

15. The method of forming flanged nails which comprises advancing a ribbon indeterminate as to length in a definite path into operative relation with notchers, for notching out portions at the side edges of the ribbon, then into operative relation with a succession of slitting elements for slitting the side faces of the ribbon, then into operative relation with flange-forming swagers for swage-forming the ribbon into I-shaped cross section, then producing a finished nail by severing the ribbon transverse the notches thereby sharpening the penetrating end of the severed nail and forming a blunt driving end on the next succeeding nail and simultaneously outwardly flaring the flanges at the penetrating end.

16. The method of forming flanged nails comprising notching metallic ribbon at spaced intervals along the side edges, slitting the ribbon to a pre-determined depth in the direction of its length on its relatively narrow faces and between the side edges, swaging the slitted portions into relatively sharp-edged parallel flanges, swage-severing the ribbon transverse the notches and simultaneously swaging corrugations between the side edges of the flanges and short the penetrating end, thereby producing a finished nail.

17. The method of forming flanged nails comprising slitting a ribbon to a pre-determined depth in the direction of its length between the side edges of its narrow faces, swaging the slit portions into relatively sharp-edged flanges, notching the flanges at spaced intervals along the side faces, then severing the ribbon transverse the notches thereby forming the finished nail.

18. The method of forming flanged nails comprising slitting a ribbon to a pre-determined depth in the direction of its length between the side edges of its narrow faces, swaging the slit portions into relatively sharp-edged flanges, notching the flanges at spaced intervals along the side faces, then simultaneously severing the ribbon transverse the notches and outwardly flaring the flanges at the penetrating end.

19. The method of forming flanged nails comprising slitting a ribbon to a pre-determined depth in the direction of its length between the side edges of its narrow faces, swaging the slit portions into relatively sharp-edged flanges, then simultaneously transversely severing the ribbon and outwardly flaring the flanges at the penetrating end.

JOHN SHERMAN McCHESNEY.